United States Patent
Jensen et al.

(10) Patent No.: US 9,764,434 B2
(45) Date of Patent: Sep. 19, 2017

(54) GENERATOR ASSEMBLY APPARATUS

(71) Applicants: Soeren Juul Jensen, Vejle (DK); John Krath Pedersen, Herning (DK); Rune Roenne Therkelsen, Hedensted (DK)

(72) Inventors: Soeren Juul Jensen, Vejle (DK); John Krath Pedersen, Herning (DK); Rune Roenne Therkelsen, Hedensted (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 362 days.

(21) Appl. No.: 13/733,168

(22) Filed: Jan. 3, 2013

(65) Prior Publication Data

US 2013/0174402 A1 Jul. 11, 2013

(30) Foreign Application Priority Data

Jan. 10, 2012 (EP) ..................................... 12150613
Nov. 9, 2012 (EP) ..................................... 12192044

(51) Int. Cl.
*B23P 11/00* (2006.01)
*B23Q 3/00* (2006.01)
(Continued)

(52) U.S. Cl.
CPC .............. *B23P 11/00* (2013.01); *H02K 15/02* (2013.01); *H02K 15/14* (2013.01); *H02K 15/16* (2013.01);
(Continued)

(58) Field of Classification Search
CPC .... B23P 11/00; Y10T 29/53; Y10T 29/49826; Y10T 29/49009; Y10T 29/49012;
(Continued)

(56) References Cited

U.S. PATENT DOCUMENTS 3,729,968 A * 5/1973 Norris ..................... B21D 53/16
                                                                72/129
4,157,613 A * 6/1979 Morrow .......................... 29/732
(Continued)

FOREIGN PATENT DOCUMENTS

CN          1095454 A     11/1994
GB          2476717 A      7/2011
(Continued)

*Primary Examiner* — Sarang Afzali
*Assistant Examiner* — Darrell C Ford

(57) ABSTRACT

A generator assembly apparatus is provided for merging a first annular component and a second annular component of a generator. The generator assembly apparatus includes first and second component support frames, a moving device and an adjustment device. The first component support frame supports the first component securely mounted to the first component support frame. The second component support frame supports the second component securely mounted to the second component support frame. The moving device moves one component support frame relative to the other component support frame to merge the components by inserting one component at least partially into an interior region of the other component. The adjustment device adjusts a position of a support frame such that a pre-defined separation between the first component and the second component is maintained during merging.

5 Claims, 2 Drawing Sheets

(51) Int. Cl.

| | |
|---|---|
| *B23P 21/00* | (2006.01) |
| *H02K 15/00* | (2006.01) |
| *B23P 19/00* | (2006.01) |
| *H02K 15/02* | (2006.01) |
| *H02K 15/14* | (2006.01) |
| *H02K 15/16* | (2006.01) |
| *H02K 15/03* | (2006.01) |
| *H02K 7/18* | (2006.01) |

(52) U.S. Cl.
CPC ........... *H02K 7/1838* (2013.01); *H02K 15/03* (2013.01); *Y10T 29/49009* (2015.01); *Y10T 29/49012* (2015.01); *Y10T 29/49826* (2015.01); *Y10T 29/53* (2015.01); *Y10T 29/53143* (2015.01)

(58) Field of Classification Search
CPC ......... Y10T 29/49133; Y10T 29/49137; Y10T 29/53143; Y10T 29/53252; Y10T 29/53261; Y10T 29/532; Y10T 29/53265; H02K 7/1838; H02K 15/02; H02K 15/03; H02K 15/14; H02K 15/16
USPC ......... 29/824, 428, 700, 596, 732, 464, 466, 29/468, 469, 434
See application file for complete search history.

(56) References Cited

U.S. PATENT DOCUMENTS

| | | | |
|---|---|---|---|
| 4,218,006 A * | 8/1980 | Atrepiev ................ | B23K 9/028 219/60 A |
| 4,945,631 A * | 8/1990 | Banner et al. .................. | 29/705 |
| 5,246,216 A * | 9/1993 | Oberst ................... | B25B 1/2415 269/266 |
| 5,272,803 A * | 12/1993 | Harrison et al. ................ | 29/596 |
| 5,640,748 A * | 6/1997 | Harrison ................... | B25B 27/10 254/29 R |
| 5,661,894 A * | 9/1997 | Kawasaki et al. .............. | 29/596 |
| 6,361,034 B1* | 3/2002 | Wolfe ................... | B25B 1/2463 269/247 |
| 6,507,990 B1* | 1/2003 | Moreno et al. .................. | 29/596 |
| 6,842,968 B2* | 1/2005 | Lilie et al. ...................... | 29/598 |
| 8,769,797 B2* | 7/2014 | Pulnikov ......................... | 29/525 |
| 2003/0221310 A1* | 12/2003 | Ponzio ............................ | 29/605 |
| 2005/0050723 A1* | 3/2005 | Hauser et al. .................. | 29/732 |
| 2010/0154201 A1* | 6/2010 | Pervaiz ............. | H02K 15/0006 29/598 |
| 2011/0162199 A1 | 7/2011 | Johnson | |
| 2012/0047704 A1* | 3/2012 | Stukey et al. .................. | 29/428 |

FOREIGN PATENT DOCUMENTS

| | | |
|---|---|---|
| JP | 61128747 A | 6/1986 |
| WO | WO 2011006810 A2 | 1/2011 |

* cited by examiner

GENERATOR ASSEMBLY APPARATUS

CROSS REFERENCE TO RELATED APPLICATIONS

This application claims priority of European Patent Office application No. 12150613.3 EP filed Jan. 10, 2012 and European Patent Office application No. 12192044.1 EP filed Nov. 9, 2012. All of the applications are incorporated by reference herein in their entirety.

FIELD OF INVENTION

The illustrated embodiments relate to a generator assembly apparatus and a method of merging a first annular component and a second annular component of a generator.

BACKGROUND OF INVENTION

Wind turbines are becoming more prevalent as these are increasingly used as a source of electricity. A direct-drive wind turbine has several advantages over a conventional wind turbine that comprises a gearbox, since a direct-drive wind turbine requires fewer parts, is less complex and more reliable. For these reasons, demand for direct drive wind turbines is increasing.

A direct-drive generator has a relatively large diameter and many magnets of alternating polarity arranged along a circumference of a field magnet arrangement—usually an outside rotor—to allow for a sufficiently high pole-change frequency. The physical dimensions and weight of such a large generator pose problems during its assembly. Handling of the heavy, unwieldy and vulnerable components is complex and time-consuming, and is also hazardous, so that strict safety measures must be adhered to. This adds considerably to the overall time and cost required for the assembly of a direct-drive generator. In particular, the merging of a large rotor with a correspondingly large stator equipped with many windings can be problematic, since a very small separation—usually only a few millimeters wide—must be maintained between the rotor and stator during and after the merging. For an interior stator inserted into an outside rotor, care must be taken to avoid a collision between the windings on the outside surface of the stator and the interior surface of the rotor.

U.S. Pat. No. 4,157,613 and JP 61 128 747 A describe apparatus for assembling a medium-sized generator with inner rotor. These techniques make use of the existing rotor shaft to facilitate assembly, in that the ends of the rotor shaft are held by holding means that guides the rotor into the outer stator. However, large generators of the type described above do not have a central shaft, and the interior of such a generator often comprises a relatively large access cavity. Usually therefore, in prior art assembly methods for a generator with outer rotor, the stator, weighing several tonnes, is suspended or held by a crane or other lifting equipment and carefully introduced into the interior space of the rotor. Even though care is taken to maintain the required separation between the rotor and the stator, the risk of damage to the windings or to the interior rotor surface is very high, and any repairs are time-intensive as well as and cost-intensive.

SUMMARY OF INVENTION

It is an object herein to provide an improved way of merging the rotor and stator of a generator of a wind turbine to avoid the problems indicated above.

This object is achieved by the features of the independent claim(s).

According to the illustrated embodiments, the generator assembly apparatus comprises a first component support frame for supporting a first annular component securely mounted to the first component support frame; a second component support frame for supporting a second annular component securely mounted to the second component support frame; a moving means for moving one component support frame relative to the other component support frame to merge the components by inserting one component at least partially into an interior region of the other component; and an adjustment means for adjusting a position of a support frame such that a predefined separation between the first component and the second component is maintained during merging.

An feature of the generator assembly apparatus according to the illustrated embodiments is that the merging step can be carried out in a controlled and precise manner, since any deviation or departure from an ideal or desired predefined separation between the first and second components can be corrected essentially immediately, so that the risk of an unwanted contact between the outer circumference of the component being inserted and the inner surface of the other component is greatly reduced or even eliminated. Furthermore, the components are securely mounted on the support frames throughout the merging procedure, so that positioning errors such as those known from the prior art merging techniques can be essentially eliminated. Here, the term "securely mounted" is to be understood to mean that a component is bolted or otherwise fastened to its support frame, so that a support frame and its mounted generator component can be moved as a single entity.

According to the illustrated embodiments, the method of merging a first annular component and a second annular component of a generator comprises the steps of securely mounting the first component on a first component support frame; securely mounting the second component on a second component support frame; moving one component support frame relative to the other component support frame to merge the components by inserting one component at least partially into an interior region of the other component; and adjusting the relative positions of the first and second component support frames such that a predefined separation between a circumference of the first component and a circumference of the second component is maintained during merging.

The secure and accurate merging method can lead to a considerable reduction in costs for the assembly of a generator, particular for a mass-production of generators, since damages can be greatly reduced and much time can be saved.

Specific embodiments and features are given by the dependent claims, as revealed in the following description. Features of different claim categories may be combined as appropriate to give further embodiments not described herein.

In the following, without restricting the invention in any way, it may be assumed that the first component mounted on the first component support frame is a rotor, for example an outside rotor of a direct-drive generator. Similarly, it may be assumed that the second component comprises a stator. Therefore, in the following but without restricting the invention in any way, the first component and the second component may simply be referred to as the rotor and the stator, respectively. Similarly, the first component support frame and the second component support frame may be referred to in the following as the rotor support frame and the stator support frame, respectively.

A support frame can be realised to support the component at any suitable orientation. In one embodiment, however, a support frame is realised such that a rotation axis of the component carried on that support frame is essentially horizontal, i.e. parallel to the ground. This allows one component to be inserted into the other without having to suspend one of the components from above.

Because one generator component must be introduced into the other component, for example the stator into an outer rotor, in a generator assembly apparatus, in one embodiment, a component support may be realised to be securely mounted to only one end portion of a generator component, for example an end face, so that the other end portion is freely suspended.

In one embodiment, a component support frame comprises a vertical frame portion or mounting surface to which an outer end portion of a component may be secured, for example by an appropriate number of fasteners such as bolts. An "outer end portion" of a generator component can be, for example, an outer vertical face when that component is oriented horizontally; an end flange arranged in or about one end of the generator component; a bearing mounted at one end of the generator component, etc. In a mounting step, then, the outer end of the generator component could be mounted or connected to its support frame by inserting an appropriate number of bolts into corresponding bushings and tightening the bolts. In another approach, the step of securely mounting a generator component to its support frame could comprise clamping the generator component to the support frame, using an appropriate number of clamps, such that the outer end portion of the generator component is pressed against the vertical frame portion. For example, in the case of a direct-drive generator with outer rotor, the rotor can be fastened at its nacelle-side to a vertical frame portion of the rotor support frame, while the stator can be fastened at its hub-side to a vertical frame portion of the stator support frame.

By securely mounting the outer end portion of a component to the vertical frame portion in this manner, the component is effectively suspended in the air, and is only held at one end. For example, the cylindrical body of a rotor (or stator) is held at one end only, and is effectively held horizontally in the air, since the rotor (or stator) is only mounted to the component support frame at one of its two outer end portions. This method of securing a rotor or stator to such a support frame also means that no part of the supporting means need be passed through any interior access cavity of the rotor or stator.

The rotor and stator of a generator generally share a common axis of rotation during operation. Therefore, to facilitate merging, in one embodiment, the support frames are realised such that the rotation axes of the rotor and stator are at the same height above ground.

One or both of the support frames may, for example, be moveable with respect to the other, so that the rotor and the stator can be aligned. Therefore, in one embodiment, the moving means comprises a number of rollers arranged on a support frame such that the support frame can be rolled or laterally displaced from one location to another. One support frame may be designed to support the combined weight of the merged generator. Therefore, the other support frame may be a better candidate for being moved independently.

For example, the stator support frame can comprise a number of rollers to allow it to be moved freely relative to the rotor support frame.

The moving means may, for example, be realised to allow the second component to be inserted into the first component such that the rotation axis of the first component essentially coincides with the rotation axis of the second component. Therefore, in one embodiment, the moving means or rollers of the stator support frame are arranged to allow the stator to be moved into a region occupied by the rotor. To this end, the stator support frame may, for example, be realised to at least partially accommodate the rotor component frame. For example, a structural frame element of the stator support frame can be realised to fit inside or outside of a corresponding structural frame element of the rotor support frame, i.e. the support frame can be "nested".

As the stator support frame moves relative to the rotor support frame, the lateral displacement is, for example, constant in one direction, i.e. the support frames may, for example, be prevented from being skewed relative to one another. Therefore, a further embodiment, the generator assembly apparatus comprises a tongue-and-groove arrangement on frame elements of the support frames.

Even a minor discrepancy or tolerance in an ideal ground level or an ideal support frame structure can lead to a corresponding departure from an ideal separation between an inner rotor surface and an outer stator surface. However, as described above, it is essential that the desired separation between these surfaces remain within an acceptable limit. For example, the separation between the inner rotor surface and the outer stator surface for a generator with a diameter of 3 m to 4 m should not deviate from 6.0 mm 1.0 mm during and after merging. Therefore, the adjustment means comprises a number of individually controllable adjusting points arranged to engage with an area or region of one component frame, so that the orientation of the component frame can be adjusted relative to the other component frame. In one embodiment, the adjustment means comprises three or four individually controllable adjusting points arranged, for example, to engage with four corner regions of an essentially rectangular component frame. The individually controllable adjusting points could be arranged on the component frame itself, for example underneath the component frame, and can be arranged to alter the position of the component frame relative to ground level. In one embodiment, the adjustment means is realised separately from the component frame, for example at a predefined region or area in an assembly line. For example, the adjustment means can be arranged at an "adjustment station", where the step of merging is carried out. In one embodiment, the adjustment means is arranged at least partially below floor level, so that, when a component frame is positioned over this region, the adjustment means can be actuated to partially lift or raise the component frame. In this way, the entire component frame can be tilted, raised, or lowered in any direction relative to the ground and of course relative to the other component frame.

In one embodiment, an adjusting point comprises a linear actuator, which is, for example, realised to raise a portion of the component frame from the ground, or to lower that portion of the component frame to the ground. For example, if a linear actuator is arranged vis-à-vis the underside of an outer corner of the component support frame, it can raise or lower that corner of the support frame, so that the support frame is tilted—even if only slightly—relative to the other component support frame.

The separation between rotor and stator is, for example, monitored during the merging process. In one embodiment, the generator assemble apparatus comprises at least one sensor for measuring a separation between the circumference of the first component and the circumference of the second component. To this end, any separation between two suitable points can be monitored to deduce the separation between the rotor inner surface and the stator outer surface. For example, a sensor can be mounted on a rotor outer surface, and can detect the distance to the outer surface of the stator. Knowing the wall thickness of the rotor, the difference—i.e. the separation between the rotor inner surface and the stator outer surface—can be deduced.

The sensors can be realised to provide feedback about the measured separation. For example, a departure from the desired separation can be indicated by an acoustic or visual signal. A service technician can then react by controlling the actuators or the rollers of the support frames to correct their alignment until the desired separation is achieved.

Such a manual correction can be time-consuming and may be error-prone. Therefore, in one embodiment, the generator assembly apparatus comprises a controlling means for controlling a linear actuator on the basis of a measurement signal delivered by a sensor. The controlling means can be, for example, a hand-held module that receives measurement signal, analyses them, and provides an indication of which adjustment means or moving means must be manipulated, and by how much, to achieve the desired separation. In one embodiment, the control module analyses the measurement signals and issues driving signals directly to the actuators and the moving means, so that the correction and alignment can be carried out in an automated manner.

In one embodiment, the step of moving the stator support frame relative to the rotor support frame to merge the components and the step of adjusting the relative positions of the support frames are performed simultaneously, so that a very accurate alignment of the rotor and stator is made possible.

BRIEF DESCRIPTION OF THE DRAWINGS

Other objects and features will become apparent from the following detailed descriptions considered in conjunction with the accompanying drawings. It is to be understood, however, that the drawings are designed solely for the purposes of illustration and not as a definition of the limits of the invention.

In the diagrams, like numbers refer to like objects throughout. Objects in the diagrams are not necessarily drawn to scale.

DETAILED DESCRIPTION OF INVENTION

Figure 1:
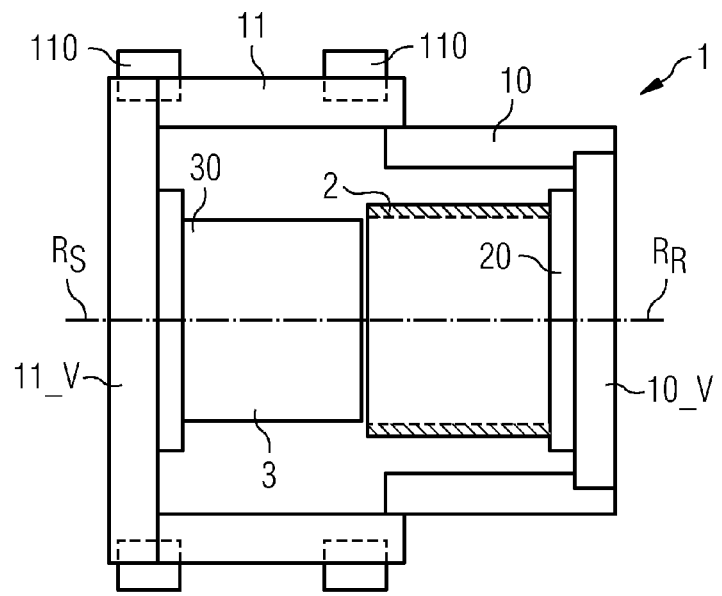
FIG. 1 shows a generator assembly apparatus according to an embodiment, in a first merging stage.

FIG. 1 shows a generator assembly apparatus 1 according to one embodiment, in a first merging stage, shown from above. Here, a stator support frame 11 bearing a horizontally oriented stator 3 has been moved in place in front of a rotor support frame 10 bearing a horizontally oriented rotor 2. In this embodiment, one outer end portion 30 of the stator 3 is fastened at its hub-side to a vertical frame portion 11_V or mounting surface 11_V of the stator support frame 11, while the rotor 2 is fastened at its nacelle-side to a vertical frame portion 10_V or mounting surface 10_V of the rotor support frame 10. In this embodiment, a bearing 20 has already been mounted to the rotor 2 as an outer end portion 20, and this bearing 20 is securely mounted to the vertical frame portion 10_V of the rotor support frame 10. The rotor 2, in this case an outside rotor 2, may or may not already have been equipped with a plurality of magnets. The diagram shows that the stator support frame 11 is designed so that it can be moved "into" the rotor support frame 10 while keeping rotation axes RR, RS of the rotor 2 and stator 3 in line. Of course, other arrangements are possible in addition to the one shown here. For example, an inner rotor could be mounted at only one of its two outer ends to a vertical frame portion of a rotor supporting frame, while an outer stator may be secured at one of its two outer ends to a vertical frame portion of a stator supporting frame, while additional support along the body of the stator may be used as required. Furthermore, whether the components are mounted at their hub or nacelle end to the relevant support frame will depend on the wind turbine design in each case.

Figure 2:
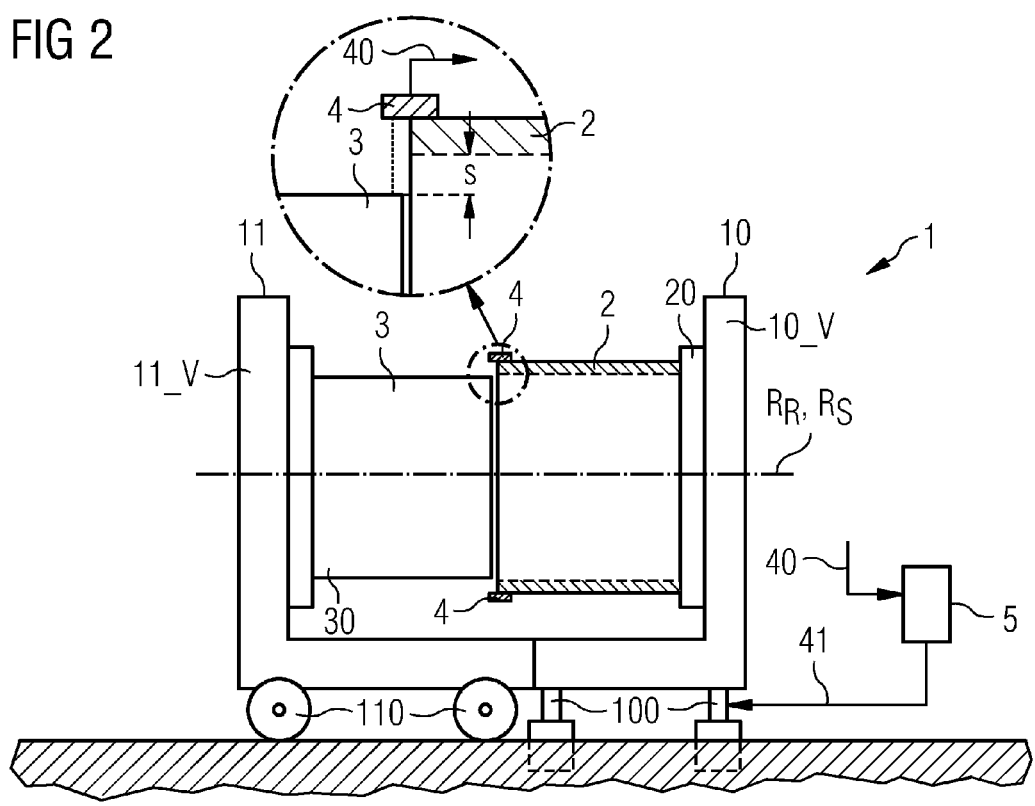
FIG. 2 shows the generator assembly apparatus of FIG. 1 in a second merging stage.

FIG. 2 shows the generator assembly apparatus 1 in a second merging stage, shown in a side view. The stator 3 has been positioned, nacelle-side first, at the hub-side of the rotor 2, ready for merging. The virtual rotation axes RR, RS of the rotor 2 and stator 3 are in line and at the same height above ground. Sensors 4 positioned at suitable points of the generator assembly apparatus 1 monitor the separation S between the stator outer surface and the rotor inner surface, constantly or at intervals. The adjustment means 100 comprises adjustment points, in this case hydraulic linear actuators, arranged underneath each of the four corners of the rotor support frame 10 and partially embedded in the floor. These can be actuated in response to measurement signals 40 delivered by the sensors 4. The adjustment means 100 can be driven by a hand-held control unit 5 or control module 5 operated, for example, by a service technician. Alternatively, the adjustment means 100 could be controlled automatically by appropriate software running on the control module 5. The control module 5 issues driving signals 41 to the adjustment means 100 to effect a vertical linear displacement of one or more of the actuators adjustment means in the directions shown. The measurement signals 40 can also be used to control wheels 110 or rollers 110 of the stator support frame 11 in order to adjust its position relative to the rotor support frame 10, for example to move the stator support frame 11 further into or back out of the rotor support frame 10 in the direction shown. This insertion step is made possible by only supporting the stator 3 at one outer end 30. The adjustment of the linear actuators and/or wheels 110 serves to ensure that a desired separation S is constantly maintained between the stator outer surface and the rotor inner surface, and that the rotation axes RR, RS coincide.

Figure 3:
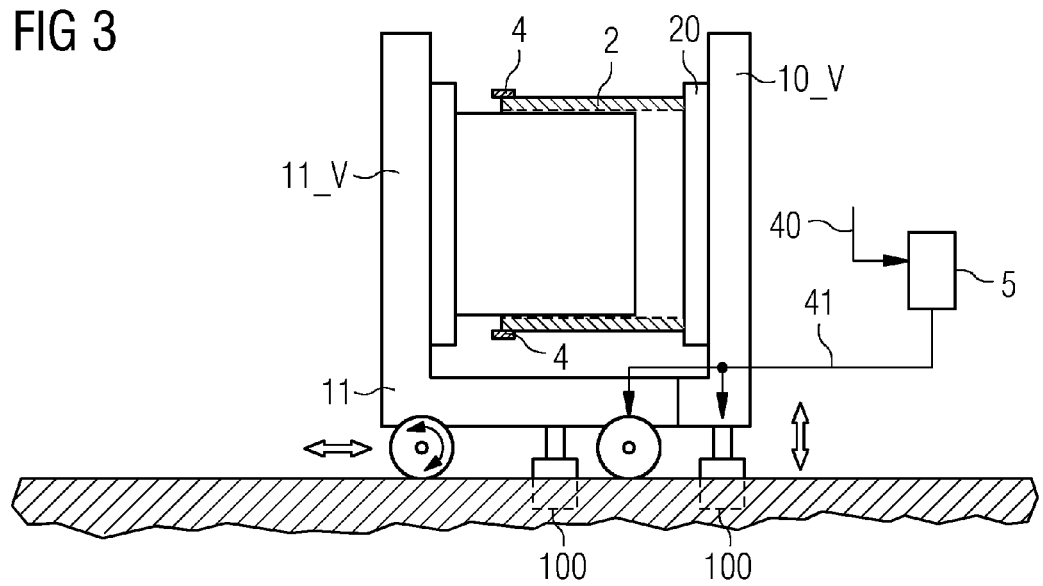
FIG. 3 shows the generator assembly apparatus of FIG. 1 in a third merging stage.

FIG. 3 shows the generator assembly apparatus 1 of FIG. 1 in a third merging stage. Here, the stator 3 is partially inserted into the interior of the rotor 2. The sensors 4 continue to monitor the separation between the stator outer surface and the rotor inner surface, and the actuators 100 of the rotor support frame 10 and/or the wheels 110 of the stator support frame 11 are controlled in response to the measurement signals 40.

Figure 4:
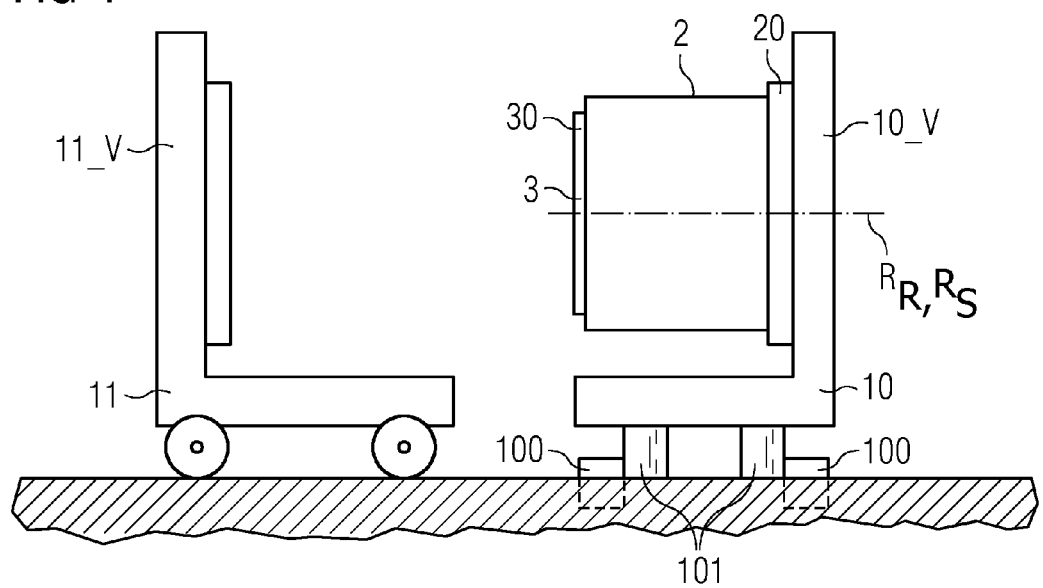
FIG. 4 shows the generator assembly apparatus of FIG. 1 in a final merging stage.

FIG. 4 shows the generator assembly apparatus 1 of FIG. 1 in a final merging stage. The stator 3 has been fully inserted into the rotor interior space and connected to a bearing 20 at the nacelle-side of the rotor 2. The stator 3 has been disconnected from the stator support frame 11, which has been moved away from the rotor support frame again 10.

The linear actuators 100 have been retracted, and the rotor support frame 10 can be moved using rollers 101 (which were not shown in the previous diagrams for clarity) to a next assembly stage. The merged generator 2, 3 can then be further processed, for example in a subsequent cabling step, before being dismounted from the rotor support frame 10 for mounting into a nacelle of a wind turbine.

Although the present invention has been disclosed in the form of specific embodiments and variations thereon, it will be understood that numerous additional modifications and variations could be made thereto without departing from the scope of the invention. For example, although the generator assembly apparatus described herein is described as holding the rotor and stator with a rotation axis in a horizontal position, the support could equally well be realised to merge the rotor and stator in a vertical manner, for example by suspending the stator support frame with vertically oriented stator to approach the vertically oriented rotor from above. The suspended stator support frame could mate or engage with the rotor support frame to stabilise it during the merging procedure. Of course, even though the description above deals with the assembly of a generator, the merging apparatus and method can be used to merge any two annular components requiring a controlled and precise merging procedure.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of merging a first annular component and a second annular component of a generator, the method comprising:
    securely mounting the first annular component on a first component support frame, wherein an outer vertical end portion of the first annular component solely presses against a vertical face of a vertical frame portion of the first component support frame, the vertical frame portion of the first component support frame suspending the first annular component in the air held horizontally at one end;
    securely mounting the second annular component on a second component support frame, wherein an outer vertical end portion of the second annular component solely presses against a vertical face of a vertical frame portion of the second component support frame, the vertical frame portion of the second component support frame suspending the second annular component in the air held horizontally at one end;
    wherein the first component support frame and the second component support frame each are realized such that a rotation axis of the component carried on that support frame is essentially horizontal
    moving one of the first component support frame and the second component support frame relative to the other of the first component support frame and the second component support frame to merge the components by inserting one of the first annular component and the second annular component at least partially into an interior region of the other of the first annular component and second annular component; and
    adjusting the relative positions of both the first and second component support frames such that a pre-defined separation between the first annular component and the second annular component is maintained during merging, wherein a plurality of individually controllable adjusting points of an adjustment device are arranged to engage with a pre-defined region of the first component support frame.

2. The method according to claim 1, wherein the step of moving one component support frame relative to the other component support frame to merge the components, and the step of adjusting the relative positions of the first and second component support frames are performed simultaneously.

3. The method according to claim 2, wherein the step of adjusting the relative positions of the first and second component support frames comprises the steps of:
    obtaining a measurement signal relating to a separation between the first annular component and the second annular component, and
    issuing a driving signal to an adjusting device to alter the position of the first component support frame and/or the second component support frame on the basis of the measurement signal.

4. The method according to claim 1, wherein the first component support frame and the second component support frame are components of a generator assembly apparatus comprising:
    the first component support frame for supporting the first annular component securely mounted to the first component support frame;
    the second component support frame for supporting the second annular component securely mounted to the second component support frame;
    a moving device for moving one of the first component support frame and second component support frame relative to the other of the first component support frame and the second component support frame to merge the components by inserting one of the first annular component and the second annular component at least partially into an interior region of the other of the first annular component and the second annular component; and
    wherein the adjustment device adjusts a relative position of both the first and second component support frames such that the pre-defined separation between the first annular component and the second annular component is maintained during merging.

5. A generator assembly apparatus for merging a first annular component and a second annular component of a generator, the generator assembly apparatus comprising:
    a first component support frame for supporting the first annular component securely mounted to the first component support frame, wherein an outer end portion of the first annular component solely presses against a vertical face of a vertical frame portion of the first component support frame, the vertical frame portion of the first component support frame suspending the first annular component in the air held horizontally at one end;
    a second component support frame for supporting the second annular component securely mounted to the second component support frame, wherein an outer end portion of the second annular component solely presses against a vertical face of a vertical frame portion of the second component support frame, the vertical frame portion of the second component support frame suspending the second annular component in the air held horizontally at one end; and
    an adjustment device comprising a plurality of individually controllable adjusting points and wherein an adjusting point is arranged to engage with a predefined region of the first component support frame;

wherein the components are operable to merge by inserting one component at least partially into an interior region of the other component;
wherein a pre-defined separation between the first annular component and the second annular component is maintained during merging; and
wherein the first component support frame and the second component support frame each are realized such that a rotation axis of the component carried on that support frame is essentially horizontal.

* * * * *